United States Patent
Have

(10) Patent No.: US 6,758,426 B2
(45) Date of Patent: Jul. 6, 2004

(54) MANUAL SHIFTING OF TRANSMISSION POWER RATIO FOR MIXER OR SHREDDER WITHOUT POWER INTERRUPTION

(76) Inventor: Conrad Ten Have, 815 Topanga Blvd., Topanga, CA (US) 90290

(*) Notice: Subject to any disclaimer, the term of this patent is extended or adjusted under 35 U.S.C. 154(b) by 113 days.

(21) Appl. No.: 10/202,417

(22) Filed: Jul. 22, 2002

(65) Prior Publication Data

US 2002/0179757 A1 Dec. 5, 2002

Related U.S. Application Data

(63) Continuation of application No. 09/493,159, filed on Jan. 27, 2000, now abandoned.

(51) Int. Cl.$^7$ ............................................... B02C 21/02
(52) U.S. Cl. ................. 241/30; 241/101.76; 241/101.2; 366/282
(58) Field of Search ........................ 241/101.2, 101.76, 241/101.762, 101.763, 30; 366/282, 283

(56) References Cited

U.S. PATENT DOCUMENTS 5,462,354 A * 10/1995 Neier .......................... 366/314

\* cited by examiner

Primary Examiner—Mark Rosenbaum
(74) Attorney, Agent, or Firm—Robert J. Schaap

(57) ABSTRACT

A shredder or mixer apparatus for the shredding or mixing of bulk material and which is mounted on a mobile chassis which may be driven by a power source on the chassis or pulled by a tractor or truck therefor. A specially designed power assist transmission receives power from the power source and is capable of being manually shifted in order to change a transmission power ratio between the power source and a shredding or mixing member, such as an auger, without any interruption of power to the auger. Thus, changes in loads on the power source can be compensated by reducing or increasing the transmission ratio without power interruption. A specially designed hydraulically operated transmission is effective for this purpose. A manually actuable shift means on the transmission is capable of being engaged by an operator and moved to any of a plurality of selected positions for shifting the transmission to different power output ratios.

22 Claims, 4 Drawing Sheets

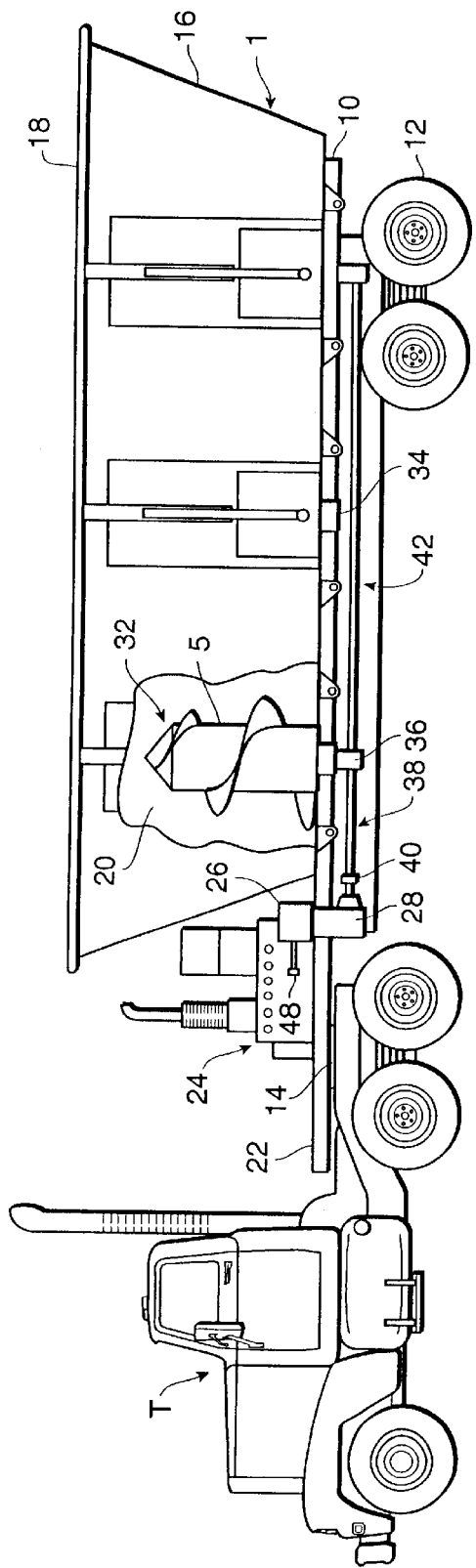
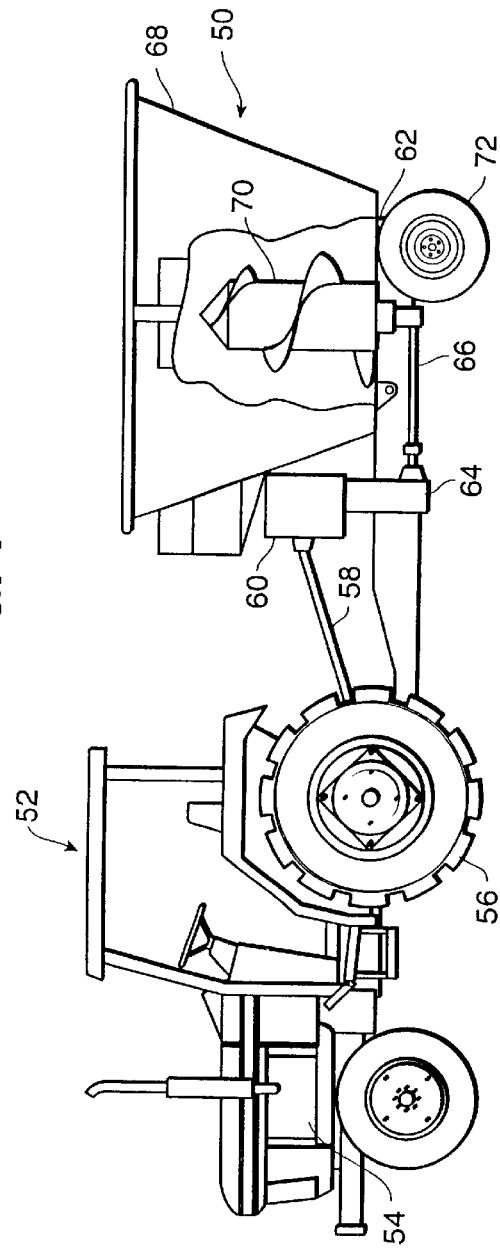

MANUAL SHIFTING OF TRANSMISSION POWER RATIO FOR MIXER OR SHREDDER WITHOUT POWER INTERRUPTION

RELATED APPLICATION

This application is a continuation of my application Ser. No. 09/493,159 filed Jan. 27, 2000 now abandoned for Manual Shifting of Transmission Power Ratio for Mixer or Shredder Without Power Interruption.

BACKGROUND OF THE INVENTION

1. Field of the Invention

This invention relates in general to certain new and useful improvements in a mixer or shredder apparatus of the type used for mixing and shredding of bulk material, such as farm feed material, and more particularly, to a mixing and shredding apparatus in which power to a shredding or mixing member can be reduced or increased by manual intervention without power interruption.

2. Brief Description of the Related Art

There have been several proposed and several commercially available mixers and shredders for mixing of bulk material or shredding of bulk material which utilize a tank containing the bulk material as well as one or more augers located with that tank and which rotate for accomplishing the shredding or mixing operation. The same apparatus is adapted for both mixing or shredding depending upon the type of auger which may used in the shredding tank and/or the rate of rotation thereof. In addition, and in the prior art, there are both horizontally arranged mixers and vertically arranged mixers.

Each of these proposed and commercially available prior art mixers generally comprise a mixer housing or tank forming a vat or chamber to receive the livestock feed or other material to be mixed or shredded, along with an auger extending into the housing and operated by an external power source. In the case of the vertically arranged mixer or shredder, the auger itself is vertically disposed.

Exemplary of such prior art shredders and mixers is U.S. Pat. No. 5,462,354, dated Oct. 31, 1995, for livestock stock feed mixer. In most cases, the shredder or mixer is used in a field environment as, for example, a farm, and is usually mounted on a chassis adapted for pulling movement. Again, the aforesaid U.S. Pat. No. 5,462,354 is exemplary of this type of arrangement. In these cases, the shredder or mixer may be pulled by a conventional tractor.

Generally, all farm tractors are provided with a means for coupling a power take off shaft commonly referred to as a "PTO" shaft. The engine of the tractor is operatively coupled to the drive wheels of the tractor for driving the tractor and which, in turn, pulls the mixer or shredder. The PTO shaft shares the power from this tractor engine for driving an auger or other rotating shredding or mixing member in the shredder or mixer.

Because of the increased demand for animal feed, the shredding and mixing tanks have been constructed with increasing sizes. In fact, there have been numerous cases where a farm owner will attempt to literally increase the size of the tank by extending the height the mixing tank in order to mix or shred a greater amount of feed material.

The amount of power which is consumed by the auger in the shredding or mixing tank is materially affected by the amount of bulk material in the tank. Moreover, the power required is a function of the density of the feed material. In addition, moisture which may be entrained in the material will also substantially affect the power requirements for rotating the auger of that mixer or shredder at a desired speed.

Because of the fact that the power to the shredder or mixer can vary with the power drawn by the wheels of the tractor, this power can be increased or decreased substantially thereby affecting the efficiency of operation of the shredder or mixer. In fact, if the tractor is traveling in a downhill mode, because of inertial forces, little power is necessary at that point in time for driving the tractor and, hence, there could be an excess of power literally delivered to the auger thereby causing the auger to overload and stress some portion of the entire mixing or shredding system.

Because of the developments in the shredding and mixing apparatus, the power required for rotation of the auger is constantly increasing, as aforesaid, thereby creating the need for variable transmission ratios between the engine and the auger. As a result, many of these shredders and mixers are provided with a gear box or transmission to change the power ratio to the auger of the shredder or mixer.

One of the main problems with the manual transmissions which have been used is the fact that in order to increase or decrease power to the auger, the user must change the gear ratio. Thus, if the user wishes to increase the power to the auger, he or she will select a lower gear ratio. However, with the manual transmission, the power train must first be disconnected. However, when power is interrupted to the auger, even momentarily, the additional problem arises, in that the power for restarting rotation of the auger can be considerable. Thus, forces are exerted upon the drive shaft and, in effect, the entire power train to the shredding and mixing apparatus. In some cases, this application of sudden power may result in damage to the drive shaft or other portions of the power train.

Another mixer/shredder apparatus which is effectively self-propelled by its own power source is that illustrated in U.S. Pat. No. 5,782,559, dated Jul. 21, 1998, for Self-Propelled Material Mixer. In this case, the power source is also shared, that is, used for driving the apparatus and also operating the auger of the apparatus. This power sharing gives rise to the types of problems mentioned above. An auger of the type which can be used in these mixing/shredding apparatus is disclosed in U.S. Pat. No. 5,732,892, for Self-Loading Auger.

One problem which arises is the fact that when the tractor or trailer is shifted into gear for driving, the torque which is used for operating the shredder or mixer is substantially reduced. This imposes additional stresses not only on the engine of the tractor, but on the shredding or mixing apparatus itself. These problems are identified in the aforesaid U.S. Pat. No. 5,462,354.

There has been at least one attempt to use an automatic transmission for incorporation in this drive train and which is shown in U.S. Pat. No. 5,462,354, as aforesaid. The automatic transmission, however, does not really solve the problems mentioned above and, in fact, in many ways, is less efficient than a manual transmission. In the case of the automatic transmission, the problem often arises that the speed of the power train is so low that the time required to mix and cut silage or other material can become excessive. There is little that the operator of the apparatus can do to affect the transmission ratio and, hence, the cutting and mixing process.

Another significant problem which has arisen in connection with the use of the automatic transmission is the fact that the transmission may literally cycle between gears.

Thus, in a lower gear, the transmission may sense the need to switch to a higher gear. However, at the higher gear, the transmission may sense a need for more power and, hence, shift to a lower gear. This cycling, particularly if it becomes a constant cycling, can severely damage the transmission or other portion of the drive train.

There have been other attempts to account for variations in the loads imposed on a mixer or shredder and for the variations in loads on a power source therefor. One such attempt, for example, includes European Patent Application No. EP 0 880 890 A1, dated May 19, 1998, and which discloses a mixer in which the required drive power of the mixing or shredding member can be temporarily reduced during the initial stages of the mixing process and, particularly, when large chunks of material are present. Also, in European Patent Application No. EP 0 880 890 A1, dated May 19, 1998, a mixer or shredder is provided with a vertically arranged auger and which uses a reversible speed reduction gear arrangement to enable alteration of the speed of the motion of the mixing unit. In effect, a transmission arrangement is provided enabling selection of two different transmission ratios. Drive power can optionally be used for other purposes during this mixing process.

In U.S. Pat. No. 4,384,455, dated May 24, 1983, for hydraulic motor bypass apparatus, a fluid bypass system with a bypass valve automatically operates to stop motion of a feed table when operation of the apparatus stalls through excessive load. In European Patent Application No. 0 659 470 A1, dated Dec. 27, 1993, a mixer or shredder is disclosed using a frustro-conical container with a generally vertically arranged auger for shredding and mixing. This device uses a transmission employing a reduction unit on the bottom of the container or a transmitting motion from a driving motor to the auger. In this particular shredder and mixer, the transmission is mounted in such manner that the auger can be located in a cantilevered fashion without any upper supporting cross member.

French Patent No. 2,737,386, dated Feb. 7, 1997, also discloses a hydraulic system utilizing valves which will function as a transmission.

In European Patent Application No. 0 659 470 A1, dated Dec. 27, 1993, there is provided an independently powered vertically arranged auger located within a frustro-conical container and which is mounted on a tractor and operated with a common power source. However, in this case, a double variable delivery hydraulic pump is coupled both to the drive unit and to the auger for both driving the truck and powering the auger. However, a complex hydraulic system is necessarily employed in the construction thereof.

There have been several proposals for dealing with the problem of changing the power available to an auger in response to the density of the bulk material and the amount of the bulk material, in addition to the automatic transmission proposal set forth in U.S. Pat. No. 5,462,354. In European Patent Application No. 0 659 470 A1, dated Dec. 27, 1993, there is provided an independently powered vertically arranged auger located within a frustro-conical container and which is mounted on a tractor and operated with a common power source. However, in this case, a double variable delivery hydraulic pump is coupled both to the drive unit and to the auger for both driving the truck and powering the auger. However, a complex hydraulic system is necessarily employed in the construction thereof.

It would be desirable to provide a shredding and/or mixing apparatus which can be powered through a PTO shaft from a tractor or other vehicle, or otherwise being powered by a dedicated power source, but which has the capability of causing a shifting of the gear ratio between the auger and power source without any interruption of power to the auger.

OBJECTS OF THE INVENTION

It is, therefore, one of the primary objects of the present invention to provide a shredding and mixing apparatus having a tank for bulk material and an auger for shredding or mixing the bulk material and which is powered from a power source with a manually actuable power shift transmission enabling the power ratio to be altered without interruption of power.

It is another object of the present invention to provide a shredding or mixing apparatus of the type stated which utilizes a transmission in which the transmission ratio between the power plant operating the shredding or mixing apparatus and the shredding or mixing member of that apparatus can be manually reduced or increased without any interruption of power to the shredding or mixing member.

It is a further object of the present invention to provide a shredding or mixing apparatus of the type stated in which an increase or decrease in forces acting on the power plant used for powering the auger can be compensated by reduction or increase of the transmission ratio between the power plant and the shredding or mixing member.

It is also an object of the present invention to provide a shredding or mixing apparatus of the type stated which utilizes a manually operable power shift transmission and which provides for manual shifting of the power ratio between a dedicated power source or a power source derived from a PTO shaft and a mixing or shredding apparatus without otherwise interrupting the power from the power source itself.

It is another salient object of the present invention to provide a transmission for delivery of power from a power source to a mixer or shredder in which the power delivered from that power source can vary depending on other loads imposed on the power source and which does not materially interfere with the shredding or mixing operation with power shifting compensation.

It is still a further object of the present invention to provide a transmission which can be used for shredding and mixing apparatus of the type stated and which allows for manual selection of a desired gear ratio and manual intervention to change that gear ratio without interruption of the power to the shredding or mixing apparatus.

It is yet another salient object of the present invention to provide a shredding or mixing apparatus of the type stated utilizing the manually actuable power transmission of the invention and which can be constructed at a relatively low unit cost and which is highly efficient in operation.

It is still a further object of the present invention to provide a manually actuable power transmission of the type stated which can be constructed with relatively inexpensive modification of an existing automatic transmission.

It is still another object of the present invention to provide a method of changing the transmission ratio between a power plant and shredding or mixing member without interruption of power to the shredding or mixing member.

With the above and other objects in view, our invention resides in the novel features of form, construction, arrangement and combination of parts and components presently described and pointed out in the claims.

BRIEF SUMMARY OF THE INVENTION

The present invention relates in general terms to a material shredder or mixer which is carried on a transportable mobile chassis and incorporates a mixing tank and vertically arranged auger disposed within that mixing tank. It should be understood in connection with the present invention that both mixing and shredding are essentially accomplished by the same apparatus and, even to some extent, the same auger used with that apparatus. Substitution of one type of auger for another could be made, if desired. Thus, it should also be understood in connection with the present invention that the term "mixing apparatus" or "mixer" will also encompass shredding apparatus and shredders and vice a versa.

The shredder or mixer may be provided with its own dedicated power source, or otherwise, power may be derived from a power take off shaft on a driving tractor or truck for operation of an auger in the apparatus. In either case, a transmission is provided and preferably located at the power source for changing the transmission ratio between the power source and a shredding or mixing member without any interruption of power to the auger in the mixing or shredding apparatus.

More specifically, the present invention is achieved by using a transmission in which the transmission ratio between the power plant and the shredding or mixing member can be reduced or increased without interruption of power, such that increased demand acting on the power plant, resulting in reduced power to the auger, is compensated for by a reduction in the transmission ratio between the power plant and the shredding to mixing member. This enables the shredding or mixing apparatus to be mounted on a stationary rotating power plant while the container of this apparatus is being filled or is completely filled.

In accordance with the invention, the power plant which is used is generally a hydrocarbon combustion engine power plant, such as a gasoline engine or a diesel engine. Further, the engine can be driven by any of a variety of fuels. The shredding or mixing apparatus usually comprises a tank or so-called "housing" which received the bulk material and which, in the preferred embodiment of the invention, is a bulk feed material. An auger is located in the tank and is usually mounted in a vertically oriented position. The upper end of the tank or housing is open for the introduction of the bulk material therein.

In accordance with the invention, the auger of the shredding or mixing member may be rotated at approximately the same speed of rotation, or otherwise, the same power level can be maintained by using different speed levels from the power plant which drives the auger. More importantly, manual intervention is provided, such that an operator of the apparatus may manually shift between the various gear ratios without ever, even momentarily, interrupting the power supplied to the auger. In this way, the auger will constantly rotate during any shifting operation.

Also in accordance with the invention, the mixing or shredding apparatus may be fitted with a draw bar, a coupling and a forwardly projecting drive shaft so that the apparatus is suitable for coupling to conventional farm tractors in such a way that the apparatus can travel behind the farm tractor while the latter is being driven. As also indicated, the apparatus may be self-propelling when provided with its own power plant.

The transmission which is used for accomplishing the unique result described herein can be actually fabricated from an existing automatic transmission which is modified to provide the manual assist transmission of the present invention. In this particular case, the transmission is provided with an input shaft and receives input power from the crankshaft output of the engine. In addition, there is an output shaft on the transmission for delivery of power to a rotatable member, such as the auger, at the mixer or shredder.

A power correcting means is located in the transmission for receiving the input power from the input shaft and for converting that power to the output shaft in order to maintain an relatively constant desired output power to speed ratio on the power shaft regardless of the external load imposed on the power source. Further, a shift means which is manually actuable by an operator is capable of increasing or decreasing the power to the rotatable member, such as the auger, without any interruption of power to that auger.

In one embodiment of the invention, the transmission comprises a manually actuable shift means in the form of a lever which can be engaged by an operator and moved to cause a shifting of the transmission to a different power output ratio with respect to the input power. In another embodiment, the shift means may comprise an electrically openable and closable switch as well as solenoids operable in response thereto in order to cause a shifting of the transmission to a different power output ratio with respect to the input power.

The power correcting means allows for increase or decrease in the transmission ratio in order to thereby provide compensation for any increase or decrease of power received at the mixing or shredding apparatus.

In the transmission which is used, the transmission can initially adopt the form of an automatic transmission and which is modified to achieve the power assist transmission of the invention. In these automatic transmissions, shifting between various planetary gear arrangements occurs with oil or other fluid under pressure. Consequently, the transmission is provided with a main oil pump in order to provide the oil or transmission fluid under pressure. The oil pump is designed only to operate in a single direction and which may be, for example, a counter-clockwise direction. However, the auger must be rotated only in one direction and never in the opposite direction, or otherwise it could seriously damage the auger blades as well as the power train to the shredder or mixer. Furthermore, the speed of rotation of the oil pump must be much higher than the speed of rotation delivered to the output shaft of the transmission and, hence, the auger of the mixer or shredder. As a result, there is needed an input shaft rotation to the oil pump which is opposite the output shaft rotation and also rotation at a different speed for the oil pump. A special planetary gear arrangement is provided for operating the oil pump at a different speed than the remaining portions of the transmission and, particularly, the output shaft thereof and also in a direction reverse to the output shaft of the transmission.

As also indicated previously, it is quite important to insure that the auger in the mixing or shredding apparatus does not rotate in an opposite direction, even momentarily. For this purpose, the shredder or mixer is also used without any forward clutch and a piece of blocking steel in the place of the forward clutch to absolutely prohibit any rotation, even momentarily, in a reverse direction. Also in accordance with the present invention, there is torque converter provided in the transmission housing.

In addition to the above, the input shaft of the transmission is mounted so that it can shift in and out in order to isolate directional force changes imposed on the transmission. This is typically due to the fact that when the mixer or shredder on its own chassis is pulled by a tractor, the angular location of the tractor in a turning movement will impose axial shiftable moving forces on the PTO shaft and, hence, on the input shaft to the transmission. The present invention thereby compensates for this problem.

The present invention can thereby be described in one aspect as a transmission for delivering of power from a power source to a mixer in which power from the power source could vary depending on other loads imposed on the power source. This drive train transmission comprises;

a) an input shaft to said transmission;

b) an output shaft on said transmission for delivering power to a rotatable member at said mixer;

c) power correcting means in said transmission receiving input power from the input shaft and connecting power to the output shaft to maintain a relatively constant desired output power on the output shaft regardless of external load imposed on the power source; and d) shift means manually actuable by an operator to increase or decrease the power to the rotatable member without any interruption of power to the rotatable member.

In another aspect, the present invention can be broadly described as a mixer or shredder apparatus for mixing or shredding a bulk material and for being pulled by a driven vehicle. This apparatus comprises:

a) a chassis with wheels mounted on an underside thereof to enable movement on a ground surface;

b) a draw bar extending from said driven vehicle and being adapted for connection to said chassis;

c) a mixing or shredding tank mounted on said chassis and having rotatable auger therein for mixing or shredding the bulk material;

d) a power source for providing power to the auger;

e) a transmission for enabling a shifting of a gear ratio between the power source and the auger; and f) means associated with the power input end of said transmission to compensate for any difference in distance between the driven vehicle and the point of connection of the draw bar to the chassis and the angular relationship between the power source or pulling tractor and the chassis.

This invention possesses many other advantages and has other purposes which may be made more clearly apparent from a consideration of the forms in which it may be embodied. These forms are shown in the drawings forming a part of and accompanying the present specification. They will now be described in detail for purposes of illustrating the general principles of the invention. However, it is to be understood that the following detailed description and the accompanying drawings are not to be taken in a limiting sense.

BRIEF DESCRIPTION OF THE DRAWINGS

Figure 3:
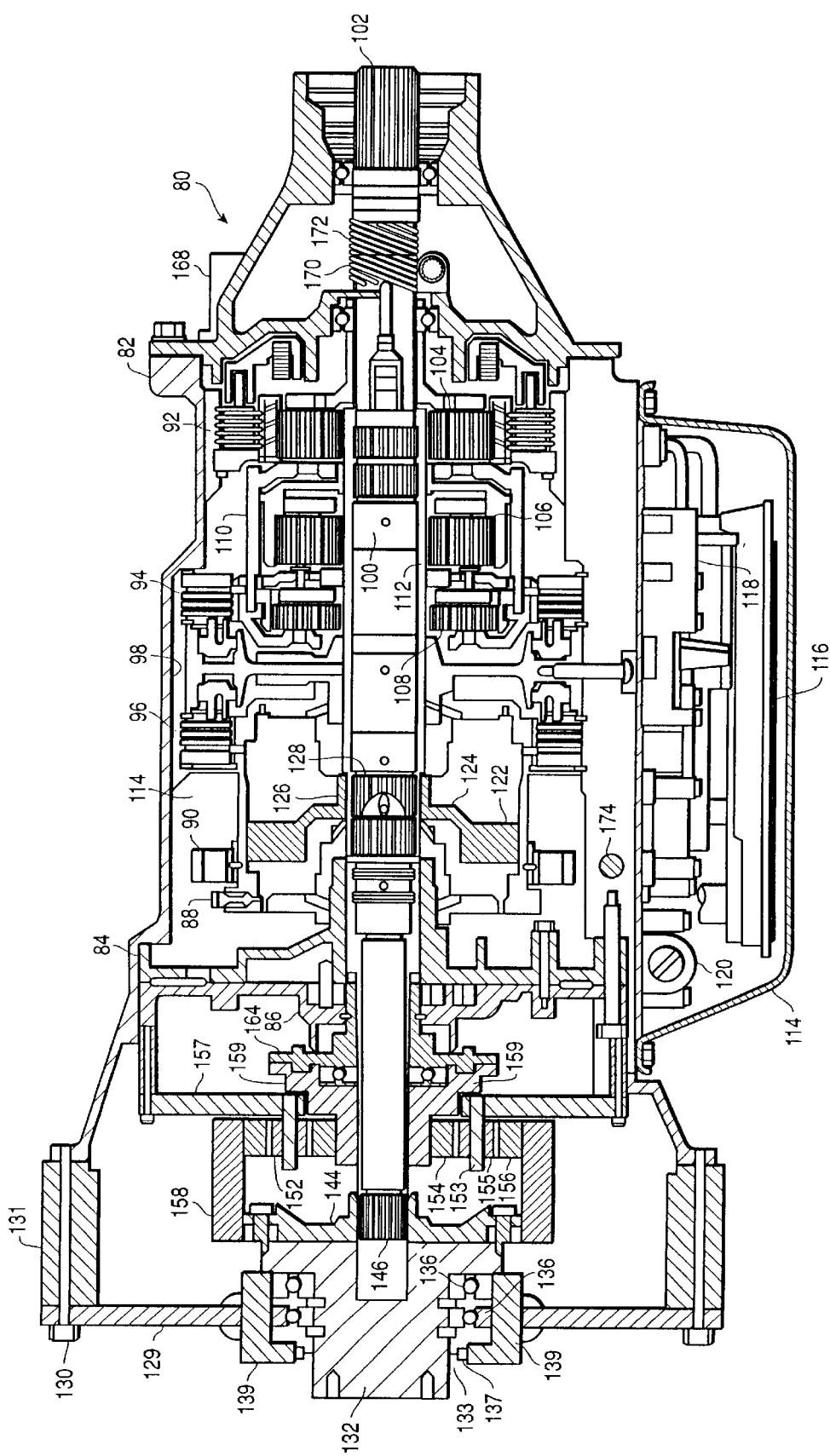
Figure 5:
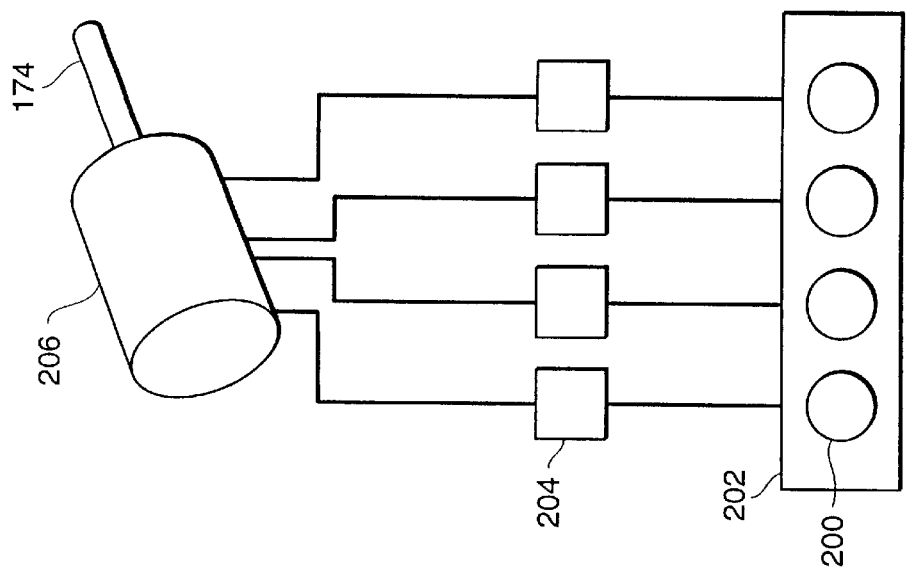
Figure 4:
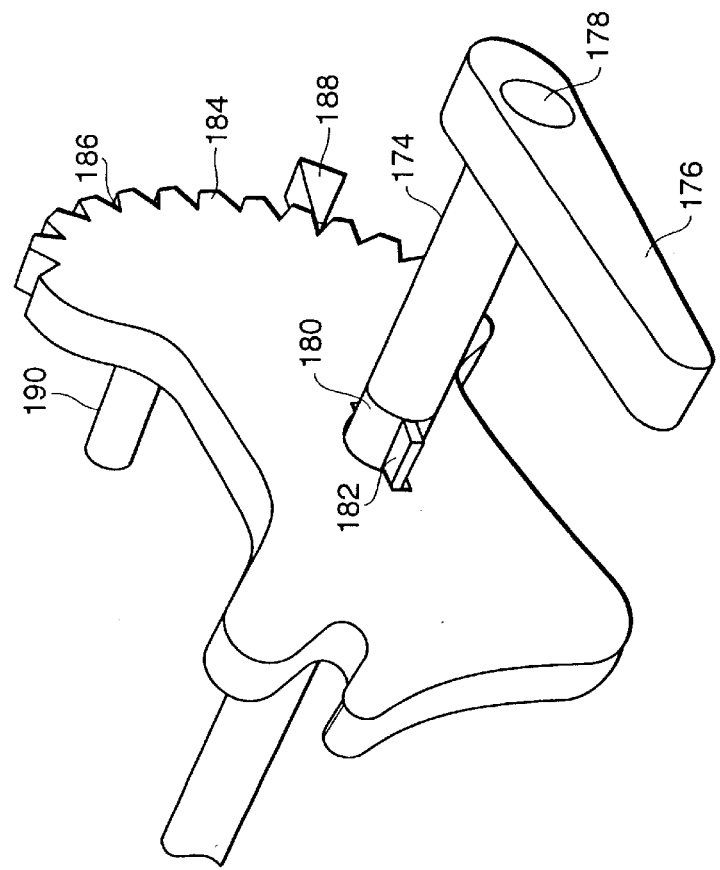
Figure 6:
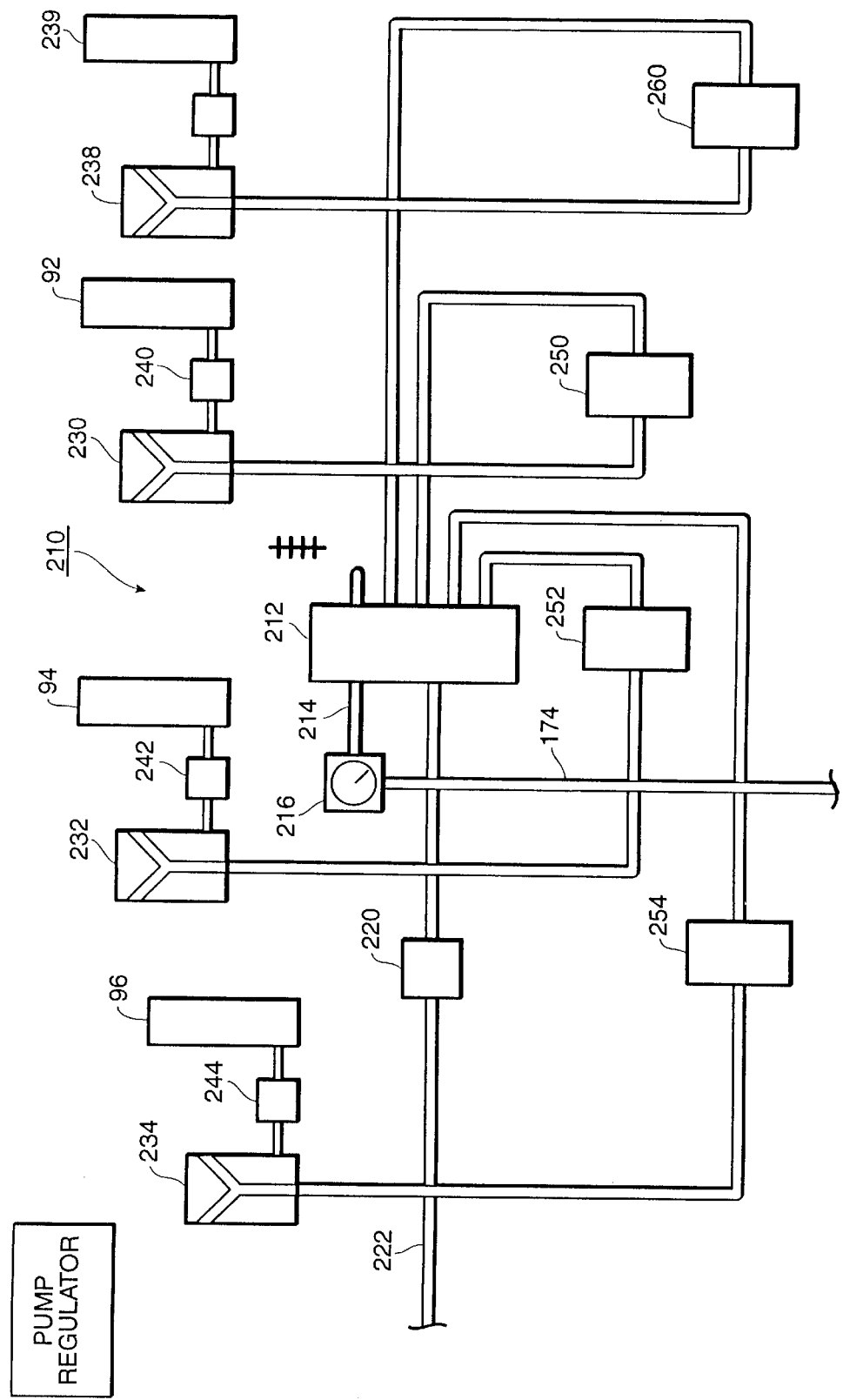

Having thus described the invention in general terms, reference will now be made to the accompanying drawings in which:

FIG. 1 is a side elevational view of a truck-trailer arrangement in which the trailer comprises a chassis holding a plurality of mixers in accordance with the invention and which is driven by a conventional truck, and which power assist transmission uses a transference of power for operation of the mixer or shredder;

FIG. 2 is a side elevational view of a mixer or shredder which is being pulled by a tractor, such as a farm tractor, and which is powered by a power take off shaft from the tractor;

FIG. 3 is a side elevational view broken away and in section and showing the interior components of a transmission forming part of the drive train for operating the shredder or mixer in either of the embodiments of FIG. 1 or 2;

FIG. 4 is a perspective view of a manually shiftable lever arrangement forming part of the transmission of the invention;

FIG. 5 is a schematic diagram showing the use of manually actuable push button switches for shifting of the transmission of FIG. 3; and FIG. 6 is a schematic plan view showing one form of fluid control circuit forming part of the transmission of FIG. 3.

DETAILED DESCRIPTION OF PREFERRED EMBODIMENTS

Referring now in more detail and by reference characters to the drawings which illustrate preferred embodiments of the present invention, A designates a transportable mixing and/or shredding apparatus for mixing or shredding a bulk material and which is adapted to be pulled by an independently powered prime mover. In this respect, the apparatus of the invention can adopt a variety of forms, as hereinafter described.

The mixer or shredder of the invention generally includes a tank and a rotatable member, such as an auger, both of which are hereinafter described in more detail. The auger can be powered by a dedicated power source or otherwise power can be derived from a power take off shaft of a pulling vehicle, such as a farm tractor. There are cases, however, when the power from a prime mover can be shared, such that some of the power developed by an engine of that prime mover can be used for operation of the wheels for driving operation and a portion can be used for operation of the auger.

Also in accordance with the present invention, each of the aforesaid apparatus for mixer or shredding, as described herein, are adapted to be transported by an independently powered prime mover. That prime mover may adopt the form of a farm tractor or a truck or the like.

Referring now to FIG. 1, it can be seen that the apparatus A includes a chassis 10 having a pair of tandem axles and wheels 12 mounted thereon. The forward end of the trailer chassis 10 is provided with a hitch mount 14 for connection to a truck T, as best shown in FIG. 1 of the drawings. The hitch 14 is of the type normally employed on truck/trailer arrangements for over-the-road long distance trucks. Thus, the details of this hitch arrangement 14 are therefore neither illustrated nor described in any further detail herein.

Mounted on the chassis 10 is an enlarged mixing or shredding tank 16 which may be provided with an open upper end 18, as shown. Otherwise, a feed opening could be provided through an otherwise closed top for introducing material into an interior chamber 20 of the tank 16.

Located on an upwardly spaced apart forwardly extending shelf 22 of the truck chassis is a an engine 24, such as a gasoline powered engine or a diesel powered engine. Again, the exact form of the engine is conventional and not described in any further detail herein. The output of the engine 24 (not shown) is connected to a transmission 26 located at the rearward side of the engine in the manner as best shown in FIG. 1. This transmission is designed to change the power ratio to the mixer or shredder, as hereinafter described.

Connected to the transmission 26 is a drop box 28. The drop box effectively receives the output of the transmission 26 for delivering of same to a power train, as hereinafter described, and may contain one or more manual controls thereon for changing the gear ratio, as may be required.

Mounted within the tank 16 are a plurality of augers (three as shown) and which may be either mixing or shredding augers and, as indicated previously, that effectively may be the same auger 32. It can be observed that each of the augers 32 are vertically arranged, as shown, so that the axis of rotation is a vertical rotation.

The lower end of the each of the augers 32 is provided with a hub 34 which extends below the bed of the tank 16, in the manner as best shown in FIGS. 1 and 2. Mounted at the lower end of each of these hubs 34 is a gear box, such as a planetary gear box, 36 for receiving a drive shaft 38. By further reference to both FIGS. 1 and 2, it can be observed that the drive shaft 38 is connected to an output of the drop box 28 through a type of universal joint 40. In this way, rotation of the drive shaft 38 through the power of the engine 24 will cause rotation of the auger 32 through the planetary gear box 36.

In the embodiment of the invention as illustrated in FIGS. 1 and 2, there are three individual augers located within the mixing tank 16. Each of the augers have a lower hub 34 disposed beneath the base of the mixing or shredding tank 16. Moreover, mounted on the lower end of each hub 34 is a similar planetary gear box 36. In order to power each of the subsequent augers 32, connecting stub shafts which serve as auxiliary drive shafts 42 are also provided and extend between the planetary gear boxes. Thus, it can be observed that a particular auxiliary drive shaft 42 extends from the first of the planetary gear boxes 36, that is, the left-hand gear box, reference being made to FIG. 2, to the next planetary gear box 36. In like manner, a third planetary gear box would also be provided for the end most auger (the right-hand end auger in FIGS. 1 and 2) and with a similar auxiliary drive shaft 42 connected to the last auger. In this way, power from the dedicated engine 24 will be employed for driving each of the individual augers.

It should be recognized that since the material contained in the tank 16 is generally uniform throughout, the power requirements for each individual auger are essentially the same. As a result, the power to each of the augers is also essentially the same. However, it should be understood that additional gear boxes could be located adjacent to or form part of each of the planetary gear boxes. In this way, the power ratios for each of the individual augers can be varied.

As an embodiment of the invention, it is also possible to use a separate manually adjustable gear box or transmission 46 located at each planetary gear box 36. The transmission 46 may also be provided with a manually adjustable mechanism 48 for shifting the gear ratio relative to each auger. Although three particular augers are illustrated in FIG. 1, it should be understood that any desired number of individual augers could be used in the mixing or shredding tank 16.

It can also be understood that a plurality of individual mixing tanks 50 could be mounted on a truck chassis 10 also having wheels 12 thereon. Thus, three or more such mixing tanks 50 could each be provided with a vertically arranged auger 32. This arrangement may be desirable where it is necessary to shred or mix differing types or selected quantities of the feed material. The remaining construction, however, would be essentially the same, in that there would still be an individual auger in each of the tanks having a planetary gear box located beneath each auger along with an auxiliary drive shaft operating that particular auger.

FIG. 2 illustrates an embodiment of the invention in which a shredding and mixing apparatus 50 is drawn by a conventional tractor 52. In this case, the tractor is provided with an engine 54 shown by phantom lines in FIG. 2 and which drives rear wheels 56 on the tractor. The tractor is also provided with a PTO shaft 58 for connection to a transmission 60 mounted on a chassis 62 of the shredder or mixer 50. In this case, it can be seen that the transmission also operates in connection with a drop box 64 and, in turn, causes rotation of a drive shaft 66.

Mounted on the chassis 62 is a shredder or mixer tank or hopper 68 and which is provided with a vertically arranged auger 70. At its lower end, the auger 70 is provided with a planetary gear arrangement 72 for connection to the drive shaft 66.

In accordance with the above-identified construction, it can be seen that rotation of the PTO shaft 58 will, ultimately through the action of the transmission 60, cause rotation of the drive shaft 66 and, hence, rotation of the auger 70. In this case, it can also be observed that there is no dedicated power source and that the power source is the engine 54 which shares power to the drive wheels 56 and to the auger 70. This also represents one of the undesirable problems as mentioned above but is resolved through the use of the transmission 60 which is, again, a power assist transmission, identical to the transmission 24, in accordance with the present invention.

Turning now to FIG. 3, there is provided a manually actuable transmission for changing gear ratios without power interruption and generally referred to as a "power assist" or "power shift" transmission, of the type used in FIGS. 1 and 2. This power assist transmission 80 comprises an outer transmission housing 82 having a forwardly located front support 84, as well as a forwardly located oil pump 86. Also located in the forward portion of the transmission housing 82 is a centrifugal valve 88 and a power take-off gear 90, although the latter two items are not necessarily critical in the operation of the transmission, as set forth herein.

Also located within the housing 82 is a first clutch 92, a second clutch 94 and a third clutch 96 and the operation of which are hereinafter described in more detail. However, these clutches 92, 94 and 96 permit shifting of the transmission into three individual gear ratios with respect to the input power delivered to the transmission. The transmission, if desired, could also be provided with a forth clutch or, for that matter, additional clutches in order to operate still other gear devices to provide still further transmission ratios with respect to the power input.

The second clutch 94 and the third clutch 96 are partially held by a center support 98, in the manner as shown in FIG. 3. A main transmission shaft 100 extends axially through the transmission housing 82 and at its rearward end, that is the right-hand end, reference being made to FIG. 3, is connected to a power output shaft 102.

Each of the aforesaid clutches, including the first, second and third clutches, all operate in connection with a separate planetary gear arrangement. Thus, the first clutch 92 operates in conjunction with a first planetary gear arrangement, often referred to as a rear planetary gear arrangement 104. The second clutch 94 operates in conjunction with a second planetary gear arrangement 106, and the third clutch operates in conjunction with third planetary gear arrangement, frequently referred to as a front planetary gear arrangement. Also located about the second or so-called center planetary gear arrangement is a planetary connecting drum 110 and which operates in conjunction with the main shaft and is concentrically disposed about the main shaft 100. The planetary connecting drum 110 also operates in conjunction with a sun gear shaft 112, in a manner to be hereinafter described in more detail.

Thus, when the planetary gear arrangements are rotated, as hereinafter described, they will rotate within the connecting drum 110 and will cause rotation of the main shaft 100 through the sun gear shaft 112.

The transmission housing 82 is provided with an oil chamber 114 which receives oil under pressure from the oil pump 86. In accordance with this arrangement, the oil effectively causes shifting of the respective clutches which, in turn, operate the individual planetary gear arrangements. In a fully automatic transmission, there is provided a torque converter which enables the shifting of the planetary gear arrangements. However, in accordance with the present invention, the torque converter, a turbine used therewith and a lock up clutch have all been eliminated and the oil which is pumped under pressure into the chamber 114 will allow for shifting of the clutches. Actual shifting, however, will be initiated through a manually actuated device, as hereinafter described. In this way, the operator of the mixer or shredder can manually shift the transmission. However, power to the output shaft 102 will not be interrupted during any shifting operation.

The planetary gear arrangements each operate with a sun gear and outer planetary gears and are therefore neither described nor illustrated in any further detail herein. Moreover, the use of the planetary gear arrangements in combination with the clutches is conventional and is shown, for example, in the MT and MTB 644 Service Manual of Detroit Diesel Allison of Indianapolis, Ind.

The transmission of FIG. 3 also includes a lower oil pan 116 containing an oil pan filter 118 along with a control valve 120. Also located in the oil pan is a modulated lock-up valve 120. This portion of the transmission is also conventional in construction. However, beyond this, the transmission has been substantially modified for use in the present invention. The very first planetary gear arrangement which would normally be present in an automatic transmission of this type has been eliminated and replaced by a input drive hub 122 and which has a ring shaped configuration along with a skirt 124 connected to a tubular collar 126 and the latter of which is disposed about a splined section 128 of the main output shaft 100. This action of the splined section and skirt permits rotation only in one direction. The use of the input drive hub takes the place of a forward clutch and forward pinion gear arrangement which would have been used in the automatic transmission. This arrangement also precludes rotation in the opposite direction which, as indicated above, could cause serious damage to the auger or other portions of the drive train.

The forward end of the transmission housing 82 is provided with a front cover plate 129 and which secured thereto by means of bolts 130, the latter of which extend through sleeves 131. The front cover plate 129 is provided with an enlarged input shaft receiving opening 133 for receiving an enlarged diameter input shaft 132. The shaft 132 is journaled within the opening 133 by means of bearings 136 and seals 137. In accordance with this construction, the input shaft 132 is allowed to freely rotate when powered by a PTO shaft or other power delivery shaft from a power source. The bearings 136 and the seals 137 are suitably retained within a bearing block 139, as shown.

Located at the rearward end of the input shaft 132 is an input drive hub 144. This input drive hub is splined to the main shaft 100 by a splined section 146. The input drive hub 144 is secured to and therefore rotatable with the input shaft 132. The input drive hub 144 is also secured to an outer planetary drive hub 146 and which, in turn, is disposed in meshing engagement with a planetary gear arrangement 152. By further reference to FIG. 3, it can be observed that the planetary gear arrangement is similar to the previously described planetary gear arrangements, such as the planetary gear arrangements 104 and 106. In this case, the planetary gear arrangement comprises an inner sun gear 154 located in meshing engagement with a pinion gear 155 and which is disposed in meshing engagement with the pump drive ring gear 156 and the latter of which are engaged with an outer planetary drive hub 158. Each of the sun gears 154 are held in their position by means of carrier pins 153. The carrier pins 153 also extend to and are held within a ground plate 157.

Also mounted on the main shaft 100 is a sun gear hub 159 and which is fixed to the sun gear 154. A pump drive hub 164 is rotatable with the sun gear hub 159. This sun gear hub 159 rotates through the action of the sun gear 154 forming part of the planetary gear arrangement 152. Thus, as the sun gear 154 rotates, the sun gear hub 158 will also rotate and cause rotation of the sun gear hub 159 and, hence, the pump drive hub 164 which is rotatable therewith. The pump drive hub 164 is, in turn, locked to the main oil pump 86.

As indicated previously, it was critical in accordance with the present invention to rotate the oil pump 86 in an opposite direction to the main shaft 100. Moreover, for proper operation, the oil pump had to be rotated at a speed significantly greater than that obtained through the rotation of the main shaft 100. The planetary gear arrangement 152 and the respective sizes of the planetary drive hub 158 permits the necessary gear enhancement to increase the speed of rotation of the pump drive hub 164. Moreover, this planetary gear arrangement 152 along with the planetary drive hub 158 and the input drive hub 144 allows for rotation in the reverse direction. In this way, the oil pump can operate at a proper speed and also operate at a proper direction for that oil pump. This also allows the remaining portions of the transmission to operate independently through the action of the main shaft 100.

It may be also be appreciated that as a tractor which is pulling the shredding or mixing apparatus turns, the point of connection of a PTO shaft from the tractor to the point of connection to the trailer of the shredder or mixer will also vary. Moreover, the angular relationship clearly changes. It can be observed from reference to FIG. 3 that, since the input drive hub 144 is splined to the main shaft 100, the entire input shaft 132 can actually shift slightly axially with respect to the main shaft. Moreover, any angular shifting effects on the input shaft will not be transmitted to the main shaft.

Shifting is accomplished through the oil under pressure and which pressure is generated by the oil pump 84. Thus, and although shifting is actually initiated by manual intervention, as hereinafter described, the actual shifting through the clutch mechanisms and the various planetary gear arrangements previously described will occur through the action of the oil under pressure. In this way, there is provided an actual shifting of gears in order to alter the gear ratio without ever interrupting any power through the main shaft 100 and the output shaft 102.

The rear portion of the housing is also provided with a rear cover 168 and which encloses a governor drive gear 170 as well as a speedometer drive shaft 172. The governor drive gear may be desirable, although the speedometer drive shaft can be used but is not necessary for operation of the transmission in the present invention.

Extending inwardly into the transmission housing from a side thereof is a main shifter shaft 174 and which will cause a manual shifting between any of the three planetary gear arrangements, including the front planetary gear arrangement 108, the middle planetary gear arrangement 106, or the rear planetary gear arrangement 104, as hereinafter described. The shifter shaft 174 is best shown in FIG. 4 of the drawings and at its outer end is provided with the manually engageable handle 48 and which is secured to the shaft 174 by means of bolt 178. The shaft 174 is provided with a pair of flats 180 for extending into and locking into a rectangularly shaped opening 182 in a ratchet plate 184. By reference to FIG. 4, it can be observed that the ratchet plate 184 is provided with a gear segment 186 for operating in conjunction with a fixed pawl 188. Thus, the ratchet plate only allows the shaft 174 to rotate to discrete positions.

In effect, and as indicated above, there are three different gear ratios allowed by the transmission and these three gear ratios are provided by the three individual clutches and the associated planetary gear arrangements. When a clutch is engaged, the planetary gear arrangement associated with that clutch will provide the specific gear ratio. Thus, the first planetary gear arrangement will provide for, e.g. the highest gear ratio, the second planetary gear arrangement will provide for an intermediate gear ratio, and the third gear arrangement will provide for the minimum gear ratio. As also indicated previously, it is possible to use still additional planetary gears and associated clutches.

The transmission of the invention also must have a neutral position, such that there is no power output when there is no need for rotation of any of the augers. Thus, there are four positions provided by the transmission. Nevertheless, only three of those positions provide for actual driving ratios, whereas the fourth position represents the neutral position. In that fourth position, none of the clutches are engaged and, hence, none of the planetary gears are actuated. However, it is important to insure that there is little or no tolerance in the actual position of the shaft 174 and, hence, the actuation of any of the individual clutches and associated planetary gear arrangements. It is for this reason that the ratchet provides for specific positions of the shaft 174.

It is also possible to use other types of manually actuable mechanisms for adjusting the position of the shaft 174 between any of the three drive positions and the neutral position. Thus, FIG. 5 represents an arrangement in which push button switches can be used. Thus, and referring to FIG. 5, it can be observed that there are a plurality of push button switches 200 mounted within a switch box 202. Thus, three of these switches will represent one of the desired gear ratios obtained through the transmission and the fourth will represent a neutral position. Each of these push button switches 200 are connected through a solenoid 204 to a servo-motor 206 and which, in turn, will operate the shaft 174. Thus, in place of using a lever 48 to rotate the shaft 174, other means could be provided for this purpose. It should also be recognized that still other means for shifting the transmission could be provided in accordance with the present invention.

The transmission is actually shifted through fluid pressure, as indicated above, and which pressure is provided through the action of the pump 86. A simplified version of the actual fluid control system forming part of the invention is more fully illustrated in FIG. 6 of the drawings. One highly effective fluid control system or so-called "hydraulic system" which can be effectively used is that shown in the Allison Transmission Service Manual for MT, and MTB 644 automatic transmissions offered by Detroit Diesel Allison of Indianapolis, Ind. However, Many of the components incorporated in that drive system can be eliminated inasmuch as the transmission of the invention does not utilize an automatic transmission arrangement. However, in order to insure a continuum of power to the output shaft during operation of the transmission and shifting of gears, the fluid drive is effective.

Referring now to FIG. 6, in a simplified version of the fluid control system 210, there is provided a manual selector valve 212 which contains four individual positions. This valve contains a shiftable selector arm 214 which is capable of moving between any of four fluid flow control positions on the valve. Moreover, the arm 214 is connected to the shaft 174 through a coupling 216. Thus, when the shaft 174 is rotated, the coupling 216 will allow a movement of the arm 214 to one of the four selected valve positions. Each of these individual positions will control the fluid flow from the pump to the manual selector valve 212.

The hydraulic fluid under pressure is provided through a main regulator valve 220 and through a hydraulic fluid supply line 222 and which is connected to the pump, as previously described.

The main manual selector valve 212 is also connected to individual shift signal valves 230, 232 and 234. Each of these valves 230, 232 and 234 are, in turn, connected to the individual clutches, such as the first clutch 92, the second clutch 94 and the third clutch 96. Although the transmission could operate without a clutch and associated pilot or relay valve for the neutral position, if desired, a relay valve 238 and associated clutch 239 could be provided for this purpose. However, this particular structure is not necessary in accordance with the present invention, since the neutral position actually represents the various planetary gear arrangements in their unactuated positions.

Each of the individual pilot valves 230, 232 and 234 are actually associated with relays 240, 242 and 244, which respectively operate the individual clutches.

As indicated previously, the pilot valves or so-called relay valves actually function as shift signal valves. In effect, these valves provide a fluid signal which represents a shifting signal. Thus, one of the valves may represent a one-two shift, the next of the valves may represent a two-three shift, and the third of the valves may represent a three-four shift. This would be equivalent to three individual drive positions in an automatic transmission, although of different gear ratios. In some cases, it may be desirable to use clutch trimmer valves in conjunction with the individual pilot valves or relay valves. These clutch trimmer valves would more accurately provide precise positioning of the relay valves and, hence, precise actuation of the individual clutches, if desired.

The main regulator valve 220 may also be connected to a main pressure line, such as the line 222. Moreover, a modulator valve with a modulator control could be incorporated in this main line 222, if desired. In addition, a governor pressure regulator could be provided along with a governor valve. In addition, modulated lock-up valves and other trimmer regulator valves could be also included in the system. In this case, the main oil pump would provide the oil under pressure to the modulated lock-up valve and a trimmer regulated valve, if desired. Otherwise, the oil pump will send oil directly to the manual selector valve 212, as shown.

In the embodiment of the invention as shown, there are three main signal shift valves, such as the valves 250, 252 and 254, as shown in FIG. 6. Each of these valves are associated with each one of the associated relay valves 230, 232 and 234, respectively. As also indicated in FIG. 6, if a neutral position clutch is employed along with a neutral position regulator valve 238, then a shift signal valve 260 would also be employed.

By further reference to FIG. 6, it can be seen that the oil under pressure is delivered from the main selector valve 212 to the individual shift signal valves and which are then, in turn, delivered to the individual relay valves 230, 232 and 234. However, if individual clutch trimmers are employed, the hydraulic fluid may also be delivered to those individual clutch trimmer valves before delivery to the individual relay valves.

It can be seen that the transmission which is used in accordance with the present invention can actually be modified by employing an existing automatic transmission and modification of the same, as shown herein. Thus, the cost of manufacture of the transmission is actually reduced. Nevertheless, it is highly effective for its intended purpose, in that it also permits manual shifting without any interruption of power and without the need for a main clutch associated with that transmission. It should also be understood that this manual assist transmission could also be used with other types of equipment in accordance with the present invention.

Thus, there has been illustrated and described a unique and novel system for manual shifting of transmission power ratios for a mixer or shredder or other type of equipment without any interruption in the power and which thereby fulfills all of the objects and advantages which have been sought therefor. It should be understood that many changes, modifications, variations and other uses and applications which will become apparent to those skilled in the art after considering the specification and the accompanying drawings. Therefore, any and all such changes, modifications, variations and other uses and applications which do not depart from the spirit and scope of the invention are deemed to be covered by the invention.

I claim:

1. A transmission forming part of a drive train for delivery of power from a power source to a mixer or shredder in which power from the power source could vary depending on other loads imposed on the power source, said transmission comprising:
   a) an input shaft to said transmission;
   b) an output shaft on said transmission for delivery of power to a rotatable member at said mixer;
   c) power converting means in said transmission receiving input power from the input shaft and delivery of power to the output shaft to maintain a relatively constant desired output power on the output shaft regardless of external loads imposed on the power source; and
   d) shift means manually actuable by an operator to increase or decrease the power to the rotatable member without any interruption of power to the rotatable member.

2. The transmission of claim 1 further characterized in that said manually actuable shift means comprises a lever which can be engaged by an operator and moved to cause a shifting of the transmission to a different output power ratio with respect to the input power.

3. The transmission of claim 1 further characterized in that said manually actuable shift means comprises electrically openable and closeable switches and at least one solenoid operable in response to opening or closing of said switches to cause a shifting of the transmission to different output power ratio with respect to input power.

4. The transmission of claim 1 further characterized in that said power converting means allows for increase or decrease of the transmission ratio to thereby provide for compensation of any increase or decrease of power required by said mixer.

5. The transmission of claim 1 further characterized in that said power converting means comprises a plurality of clutches with each clutch being associated with a different power output ratio between the input shaft and the output shaft and an associated gear assembly for altering the power output to the output shaft.

6. The transmission of claim 5 further characterized in that an oil pump forms part of said transmission for delivery of hydraulic fluid to components in said transmission and means is provided to reverse the direction of rotation of the oil pump with respect to both the input shaft and the output shaft and to also increase the rate of rotation of the oil pump with respect to the rate of rotation of the input shaft.

7. The transmission of claim 5 further characterized in that:
   a) a main shaft extends through said transmission and co-acts with said gear assemblies and clutches; and
   b) means for connecting said input shaft to said main shaft in such manner that axial displacement between the input shaft and the main shaft can take place in order to compensate for a change in angular relationship between a tractor pulling the apparatus in which the transmission may be located.

8. The transmission of claim 5 further characterized in that said transmission comprises:
   a) a selector valve having a valve position for each of the individual gear assemblies and associated clutches;
   b) a shaft extending from said shift means to said selector valve for causing actuation of the selector valve to any one of the fixed positions thereon;
   c) an associated pilot valve provided for each of the separate positions on said selector valve; and
   d) means connecting each pilot valve to an associated clutch for causing operation of that clutch and, hence, the gear assembly associated with that clutch to thereby alter the gear ratio between the input shaft and the output shaft.

9. A mixer or shredder apparatus for mixing or shredding a bulk material and for being pulled by a driven vehicle; said apparatus comprising:
   a) a chassis with wheels mounted on an underside thereof to enable movement on a ground surface;
   b) a draw bar extending from said driven vehicle and having means for connection to said chassis;
   c) a mixing or shredding tank mounted on said chassis and having rotatable auger therein for mixing or shredding the bulk material;
   d) a power source for providing power to the auger;
   e) a transmission for enabling a shifting of a gear rotation between the power source and the auger; and
   f) means associated with the power input end of said transmission to compensate for any difference in distance between the driven vehicle and the point of connection of the draw bar to the chassis and to compensate for changes in the angular relationship of the apparatus and the driven vehicle.

10. The mixer or shredder apparatus of claim 9 further characterized in that the means associated with the input power end of the transmission comprises an input drive hub fixed to an input shaft at the power input end of said transmission, a main shaft extending through said transmission and being connected to an output shaft of said transmission, and a splined section located between said main shaft and said input drive hub to allow axially shiftable movement between said main shaft and said input shaft.

11. The mixer or shredder apparatus of claim 10 further characterized in that said input shaft has a recessed end facing said main shaft to receive the splined section of said main shaft.

12. The mixer or shredder apparatus of claim 9 further characterized in that said transmission comprises:
   a) an input shaft on said transmission;
   b) an output shaft on said transmission for delivery of power;
   c) power converting means for receiving input power from the input shaft and delivery of power to the output shaft at different ratios between the input and output power thereof depending upon the external loads imposed on any power source for said transmission; and
   d) shift means manually actuable by an operator to increase or decrease power to the output shaft without any interruption of power to the output shaft.

13. The mixer or shredder apparatus of claim 12 further characterized in that said shift means comprises a lever which can be engaged by an operator and moved to cause a shifting of the transmission to a different power output ratio with respect to input power.

14. In a mixer or shredder of bulk material having a mixing or shredding tank with a chamber and an auger therein for causing a shredding or mixing of bulk material in said tank upon rotation thereof, an improvement comprising:
   a) a power source having an output enabling said power source to provide rotational power to the auger;
   b) a power output shaft from said power source;
   c) a manually shiftable transmission located to receive the power provided by said power output shaft capable of providing a plurality of power to speed gear ratios upon shifting thereof without any interruption of power to the auger during the shifting of the gear ratios; and
   d) a drive shaft extending from said transmission to said auger for providing rotatable power to said auger.

15. The improvement in the mixer or shredder of claim 14 further characterized in that connecting gear means operatively connects said drive shaft to said auger for causing rotation thereof.

16. The improvement in the mixer or shredder of claim 14 further characterized in that said transmission is a manually shiftable transmission enabling an operator to charge the gear ratio to the auger at will.

17. An improvement in a transmission for delivery of power from a power source to a movable member and in which power from the power source can vary depending upon external loads imposed on that power source, said transmission comprising:
   a) an input shaft on said transmission;
   b) an output shaft on said transmission for delivery of power to said movable member;
   c) power converting means in said transmission receiving input power from the input shaft and delivery of the power to the output shaft to maintain a relatively constant desired output power on the output shaft regardless of external loads imposed on the power source; and
   d) shift means manually actuable by an operator to increase or decrease power to the movable member without any interruption of power to the movable member.

18. The improvement in the transmission of claim 17 further characterized in that said transmission comprises a manually actuable shift means which can be engaged by an operator to cause a shifting of the transmission to a different power output ratio with respect to the input power and without any interruption of power to the movable member so that power is constantly maintained at the movable member.

19. The improvement in the transmission of claim 18 further characterized in that said movable member is a rotatable member and said power input shaft is a rotatable shaft and said power output shaft is a rotatable shaft.

20. The improvement in the transmission of claim 18 further characterized in that said power converting means comprises a plurality of clutches with each clutch being associated with a different power output ratio between the input shaft and the output shaft and an associated gear assembly for altering the power output to the output shaft.

21. The improvement in the transmission of claim 20 further characterized in that said transmission comprises:
   a) a selector valve having a valve position for each of the individual gear assemblies and associated clutches;
   b) a shaft extending from said shift means to said selector valve for causing actuation of the selector valve to any one of the fixed positions thereon;
   c) an associated pilot valve provided for each of the separate positions on said selector valve; and
   d) means connecting each pilot valve to an associated clutch for causing operation of that clutch and, hence, the gear assembly associated with that clutch to thereby alter the gear ratio between the input shaft and the output shaft.

22. A method for delivery of power from a power source to a rotatable member in a shredder or mixer and where power from the power source could vary depending upon other loads imposed on the power source, said method comprising:
   a) providing input power to an input shaft of a transmission;
   b) converting the power from the input shaft to a different power output and concomitantly altering the speed of movement thereof regardless of the external loads imposed on the power source; and
   c) delivery of the converted power at different input-output power ratios to a power output shaft without any interruption of power to any movable member therefor.

* * * * *